INVENTOR.
HENRY L. ARCE
DONALD L. STONER
JACK L. WHITENER

ATTORNEY

INVENTOR.
HENRY L. ARCE
DONALD L. STONER
JACK L. WHITENER

ATTORNEY

United States Patent Office 3,365,643
Patented Jan. 23, 1968

3,365,643
AUTOPILOT UTILIZING A HALL ELEMENT
Henry L. Arce, Huntington Park, Donald L. Stoner, Alta Loma, and Jack L. Whitener, Los Alamitos, Calif., assignors, by mesne assignments, to Ametek, Inc., New York, N.Y., a corporation of Delaware
Filed Oct. 12, 1964, Ser. No. 403,048
17 Claims. (Cl. 318—489)

This invention relates to automatic navigation systems for mobile craft such as air and water craft and, in particular, relates to an automatic directional control system for water craft.

Conventional autopilots for such craft have a directional control system based on compasses or other complex earth-magnetic field pick-up devices and error signal generators such as balanced three phase induction elements. These direction sensing generators are fairly complex in mechanical design or circuitry to permit a sufficient degree of sensitivity, yet provide a dampened action to avoid over control.

Various means have been employed with autopilots based on the aforementioned directional signal generators to effect a proportionating type control, i.e., to impress a control surface position feed back on the control unit to modify the control and restore the control surface position to normal as the craft returns to its set course. Mechanical interlocks between the sensing element and the control surface have been used as well as separate electrical signal generators on the control surface or its servo motor which provide a signal that opposes the signal of the directional sensing generator. A difficulty with the electrical signal feedback devices is that they are essentially null seeking elements which must be synchronized with the control surface position to avoid a feedback signal when the latter is at its normal position. Additionally, the function of craft trimming, i.e., providing an off-set position of the control surface to counter cross-course forces, requires the use of yet another electrical signal generator to modify the signal from the directional sensing signal generator. Consequently, the all-electric autopilots heretofore employed have been quite complex and costly.

The compass based systems, while somewhat simpler in circuitry, employ mechanical interlocks or feedback means which are often cumbersome and are not readily adapted to a wide variety of craft. Additionally, magnetic compasses employ various dampening means which impart a drag to movement of the compass needle and this drag with the inertia of the compass results in a slowly responding sensing element. Autopilots based on such sensing elements are therefore slow in response, often resulting in a hunting action.

As a result of the aforementioned difficulties, there exists a need for a simple and inexpensive autopilot, particularly for marine craft, that can be adapted for a wide variety of craft. In addition, such an autopilot should empoly a simple, directional sensing signal generator that effects a proportionating control without use of mechanical feedback or synchronized electrical feedback generators. Desirably, such an autopilot should also have a remote control means to permit the remote manual control of the rudder servo motor.

It is an object of this invention to provide an autopilot for craft that employs a mechanically and electrically simple directional sensing means.

It is also an object of this invention to provide such an autopilot with a simple electrical feedback signal means that does not require synchronization.

It is a further object of this invention to provide such an autopilot with the function of craft trimming without employing a separate signal generator for this function.

It is also a further object of this invention to provide an autopilot with a simple directional sensing element having a high sensitivity and rapid response to directional changes.

It is an additional object of this invention to provide an autopilot with a remote control unit that permits interruption of the automatic control.

Other and related objects will be apparent from the following description of the invention.

We have now found that the aforementioned objects can be readily provided by the autopilot of our invention by use of a directional sensing element employing a semi-conductor body exhibiting the Hall effect, hereafter referred to as a Hall element. Hall elements have, of course, been known for years, yet heretofore there has been no attempt to employ these elements in a commercial autopilot although various circuits have been proposed to use Hall elements in multipliers and magnetic field measuriing and testing instruments. The direct substitution of the Hall element circuits of these instruments in an autopilot however, does not provide a reliable control. Instead, reliable control requires the provision to maintain a constant balance between the input and output circuits of the Hall element.

Briefly, the autopilot of our invention comprises a source of a reference alternating current signal, a Hall element connected thereto, an output transformer with the primary winding thereof connected to the Hall element output electrodes and a balancing bridge comprising a variable impedance across the alternating current input signal leads in parallel to the input Hall element electrodes with the center tap of the primary winding of the output transformer connected to ground and to the balancing bridge circuit.

We have further found that a proportionating control of our autopilot can be simply effected by using variable means in the balancing bridge to shift the resistive null of the Hall element in response to the movement of the rudder. Such means comprises a potentiometer in the balancing bridge circuit with its variable tap connected to the center tap of the primary winding of the transformer. The potentiometer's variable tap is mechanically coupled to the craft's control surface to move with said surface and thereby effect a proportional shift in the Hall element resistive null.

Remote control means are also provided in our autopilot comprising a hand unit having a selector switch to control the mode of operation from automatic, remote manual and standby, and separate switches to control the movement of the rudder to left, right and center positions by directly actuating the rudder motor. The standby position of the remote unit serves the function of setting a course with the autopilot in a manner hereafter described in detail.

The autopilot of our invention will now be described in greater detail in reference to the figures, of which:

Figure 1:
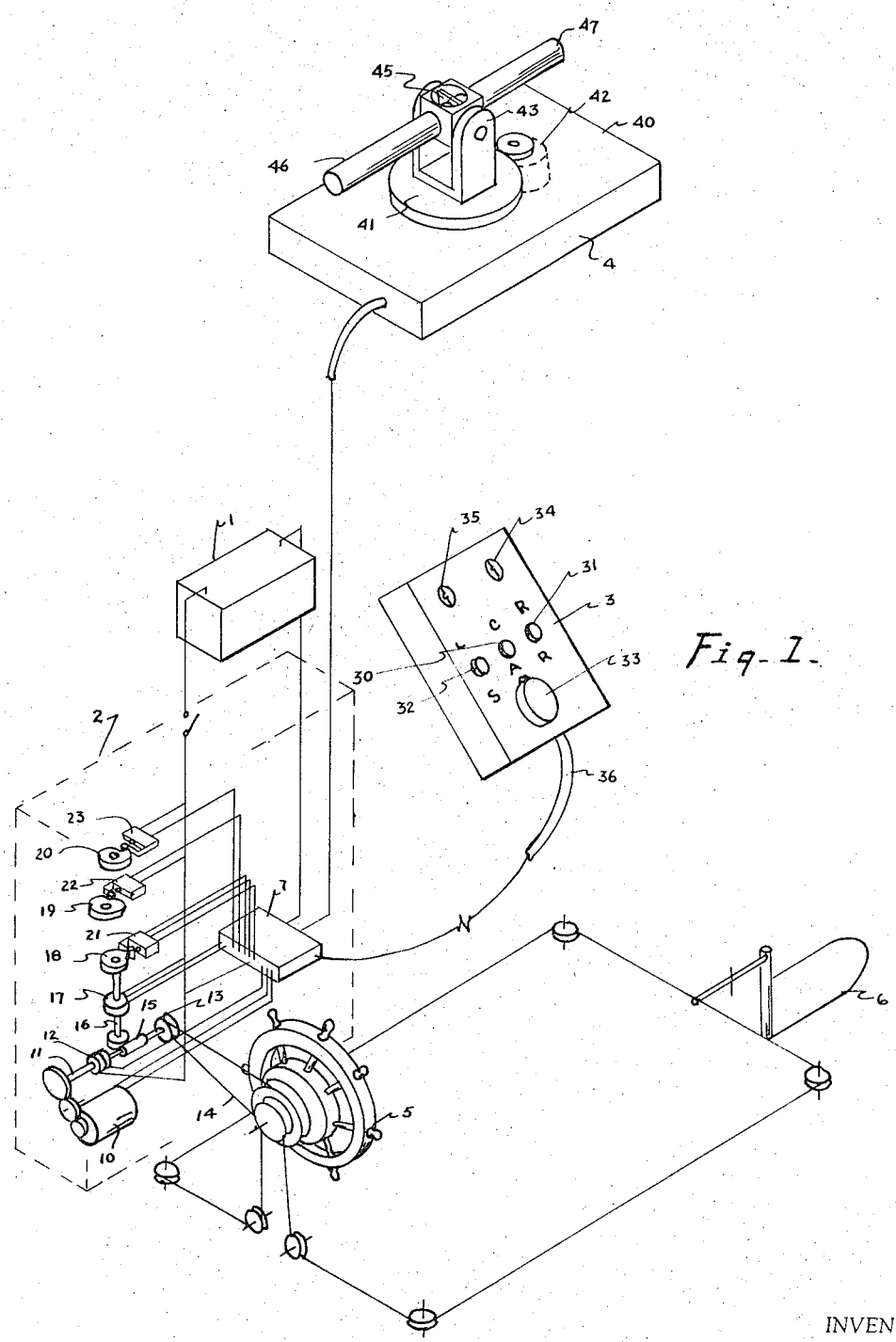
FIGURE 1 illustrates the autopilot system and mechanical features of the autopilot.

FIGURE 1 shows the autopilot to comprise a power supply 1, a control power unit 2, a remote hand control unit 3 and a directional signal generator and amplifier unit 4. The autopilot is illustrated in an operative connection to a marine craft steering system comprising helm 5 with steering cables connected to rudder 6.

The control power unit is shown in an expanded view to illustrate the cam actuated limiting and centering switches. This unit comprises a reversible direct current motor 10 that drives power shaft 11 through a suitable gear train. A solenoid clutch 12 is employed to permit disengagement of the power unit and permit navigation by helm 5. A drive sprocket 13 is linked to a corresponding sprocket on the helm shaft by chain 14, although any other positive drive could also be used, as apparent to those skilled in the art. A worm gear 15 couples the rudder side of drive shaft 11 to shaft 16 and a potentiometer 17 is mounted on shaft 16 and electrically connected to the balancing bridge between the Hall element input and output circuits in a manner hereafter described in regard to FIGURE 2.

Also mounted on shaft 16 are cams 18, 19, and 20, for, respectively, rudder centering switch 21 and left and right rudder throw limiting switches 22 and 23. The functioning of these switches in their circuits will be described in greater detail in reference to FIGURE 3. Briefly, however, these switches are in the power supply to the rudder motor relays and are normally closed to permit the autopilot of the hand unit to control the movement of this motor. The degree of rudder throw in either direction is controlled by cams 19 and 20 which rotate and open the power circuit at the maximum set rudder throw. The degree of rudder throw can be varied in either direction by adjustment of the angular position of the cams on shaft 16. These cams rotate with movement of the rudder until they open the power circuit to their corresponding motor relay at the maximum set rudder throw. Set screws, not shown, are used in each of the cams to lock the desired position of the cams to shaft 16.

Rudder centering switch 21 is a single pole, double throw switch, the position of which is controlled by cam 18. The latter cam is positioned on shaft 16 to coincide with the center rudder position and locked to the shaft with a set screw. Movement of the cam in either direction closes a circuit through the centering switch of the hand unit to the appropriate motor relay so that the rudder is moved in a centering direction. In this fashion, actuation of the centering circuit by switch 30 of the hand unit 3 will return the rudder to center and retain it in that position by repeated reversals of the direction of rudder motor 10, resulting in oscillation about rudder center position. The sensitivity of switch 21 is sufficiently high so that the rudder is substantially centered at any position within the oscillating rudder throw.

As previously mentioned, the remote hand unit comprises means to interrupt the automatic control of the autopilot and to interpose manual control. Selector switch 33 controls the mode of operation of the autopilot from remote control R with the hand unit 3 to automatic control A with the directional sensing generator and amplifier 4 to standby S when the craft can be controlled by the helm 5. Rudder direction indicating lights 34 and 35 are provided to indicate right or left, respectively, actuation of the rudder motor.

When the selector switch is turned to remote, the autopilot unit 4 is disengaged from control and the craft's course is controlled by rudder motor 10. Switches 32, 30 and 31 actuate the motor 10 directly through the motor control relays in unit 7. Switches 31 and 32 close their respective right and left motor control relays to move the rudder in a right or left direction. The centering rudder switch 30 returns the rudder to center.

The directional control amplifier is in unit 4 of our invention and is housed within base 40 on which is mounted rotatable table 41. Table 41 is driven by motor 42 in unit 4 and supports stand 43 which provides a gimbal mount for holder 45 that, in turn, supports the Hall element in the gap between flux concentrators 46 and 47. Ferrous metal, preferably of high magnetic permeability such as Mumetal or Permalloy C can be used for the concentrators.

The semi-conductor employed for the Hall element can be any of the semi-conductors known to exhibit the Hall effect. These bodies are commercially available, e.g., Hallefex generators from the Helipot Division of Beckman Instruments, Inc. Thin film indium or germanium combined with antimony or arsenic can be used as the crystal material for the Hall generator. Input electrodes are attached to the opposite edges of the element, and output electrodes are attached to the remaining edges along an axis substantially perpendicular to the axis of the input electrodes. During fabrication, attempts are made to locate the axis of the output electrodes along an equipotential line; however, in practice it is quite difficult to locate these electrodes so precisely and some inherent electrode misalignment usually is present. Means, hereafter described, are employed in the balancing circuit of the autopilot to correct this misalignment.

The Hall element is used as a null seeking signal generator wherein it is positioned substantially transverse to the earth's magnetic field. The control circuit of our autopilot is devised to amplify the error signal resulting from deflection of the Hall element out of its null position and to move the craft's rudder to restore the direction of the Hall element to null when placed in control of the craft through the rudder motor. When a course is to be set and the craft locked to the control of the autopilot, the selector switch 33 is turned to S and in this position, the error signal from the Hall element and amplifier is applied to motor 42. This signal causes motor 42 to rotate the Hall element into a null position with respect to the instant heading of the craft and the rudder position so that, upon switching 33 to automatic control A, this heading and rudder position is locked in as the set course of the craft.

The set course heading can be interrupted at any time by turning the power switch to off, or by turning switch 33 to remote R and employing the hand unit with switches 30, 31 and 32 to control the craft. So long as the relative position between the craft and the Hall element is not changed, the original course setting will be automatically resumed upon return of the power to the unit or by the return of switch 33 to position A.

Figure 2:
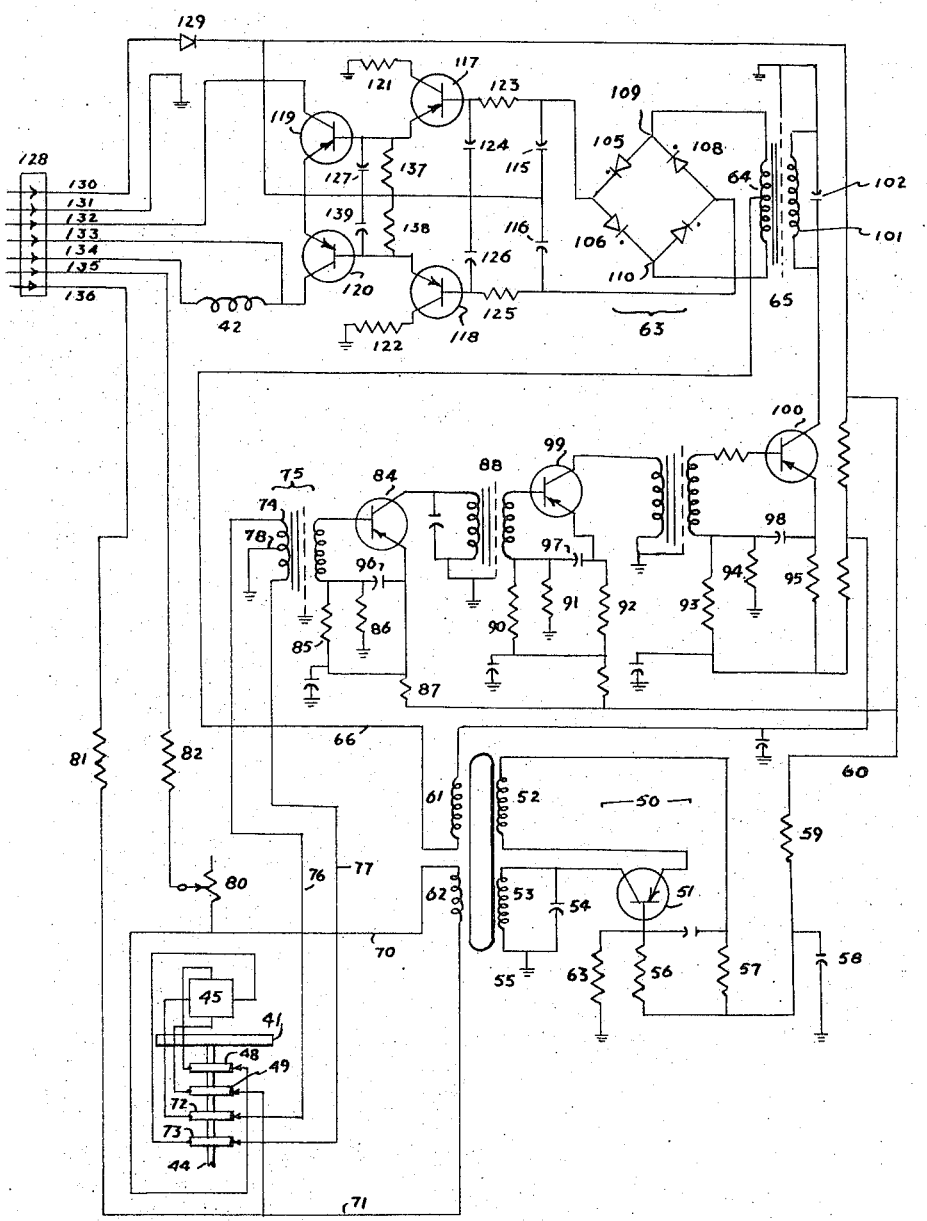
FIGURE 2 shows the schematic circuitry of the directional signal generator and amplifier unit.

Referring now to FIGURE 2, the circuitry of the signal generator and amplifier of our autopilot will now be described. Briefly, a reference alternating current voltage is applied to the Hall element input electrodes. When the element is in a null position, the output electrodes receive a very slight signal. Any deflection of the Hall element from null, however, creates an error signal having an amplitude proportional to the magnitude of the deflection with an advancing or retarding phase shift depending on the direction of the deflection. The error signal is amplified, applied to a phase discriminator that generates a current signal having a magnitude proportional to the degree of deflection from null and a polarity determined by the direction of the deflection.

The reference alternating current signal for the Hall element is generated in a conventional oscillator circuit 50 which employs transistor 51 in common base configuration with feedback from secondary 52. The tank circuit comprising capacitor 54 and the primary winding 53 of transformer 55 determines the resonant frequency which can be about 1000 c.p.s. and resistors 56 and 63 are employed to provide the forward bias. Resistor 57 is used to furnish D.C. stabilization of the circuit. The oscillator circuit is isolated from any signals on the B+ line 60 by resistor 59 and capacitor 58.

The oscillator outputs are developed across secondary windings 61 and 62. Winding 61 is used to develop the reference phase for the phase discriminator circuit 63 and is coupled to the center tap of the secondary winding 64 of the discriminator transformer 65 by lead 66.

Winding 62 develops the alternating current drive for the Hall element and is coupled to the element's input electrodes by leads 70 and 71 which are connected to slip rings 48 and 49 that are mounted on shaft 44 of turntable 41 and isolated from mutual contact by insulating washers, not shown. The Hall element output electrodes are connected by slip rings 72 and 73 to leads 76 and 77 which are coupled to the primary winding 74 of the amplifier input transformer 75. The center of winding 74 is grounded as shown by connector 78. The balancing portion of the bridge used in accordance with our invention is connected across the Hall input electrodes and comprises leads 135 and 136, variable impedance 80, which is used to correct for Hall element electrode misalignment, fixed resistors 81 and 82 and potentiometer 17 which is located in the control power unit 2; see FIGURES 1 and 3.

When the Hall element is in its null position, only a very slight signal is generated across winding 74. The deflection of the Hall element from its null position, however, generates an error signal across winding 74 which is of an advancing or retarding phase depending on the direction of the deflection. The error signal developed across the amplifier input transformer secondary winding is amplified by a three stage amplifier comprising transistors 84, 99 and 100 employed in classic common emitter configuration. Resistors 87, 92 and 95 are used to provide D.C. stabilization for each of the amplification stages and resistors 85 and 86, 90 and 91 and 93 and 94 provide the forward bias for the amplification stages. Capacitors 96, 97 and 98 are used to trap any degenerative components.

The amplified error signal is applied to the primary winding 101 of the phase discriminator transformer 65 by lead 103. Capacitor 102 is employed in parallel to winding 101 to tune the transformer to the signal frequency. The output of the transformer 65 is applied to points 109 and 110 of the phase discriminator bridge comprising diodes 105, 106, 107 and 108.

When the Hall element is in its null position, there is no net voltage between points 109 and 110 since the reference signal is connected parallel to the bridge at the center tap of winding 64. This reference signal produces phase cancellations with the error signal appearing at each end of the secondary winding 64. Thus, in a balanced state, diode 105 will produce exactly the same positive potential at point 111 as the negative potential produced by diode 106. Similarly, the negative and positive potentials developed at point 112 by diodes 108 and 107, respectively, will be equal.

When the Hall element is deflected from its null, however, the signal phase relationship between points 109 and 110 will change, one point advancing in phase while the other retarding, depending on the direction of the deflection. This creates an unbalance in the bridge, e.g., if the Hall element is moved clockwise, the phase at point 109 retards and that at point 110 advances. With this phase change, diode 105 will conduct less and diode 106 more so that point 111 will become predominantly negative. Similarly, diode 108 will conduct less and diode 107 more so that point 112 becomes predominantly positive. The error and reference signal components are filtered by capacitors 115 and 116 to obtain a net D.C. error signal having a magnitude proportional to the degree of change (degree of deflection of the Hall element) and a polarity determined by the direction of the deflection.

The error signals are applied to direct current amplification stages comprising transistors 117 and 118. Transistors 117 and 118 are employed to supply the base current required to actuate switch transistors 119 and 120, respectively. The maximum emitter current of transistors 117 and 118 is limited by resistors 121 and 122. To provide a time delay in the autopilot and thereby cancel out short duration signals caused by vertical movement of the Hall element by wave action, resistors and capacitors 123 and 124 and 125 and 126 are provided in the base circuits of the current amplification transistors, forming a RC delay circuit.

Switch transistors 119 and 120 will conduct only when their respective bases are made negative with respect to the common B plus line. The direct current error signal will increase the current flow through the base of its transistor until sufficient current flow is present to energize the relay of the rudder motor shown in FIGURE 3. Capacitors 127 and 139 filter the error signal and resistors 137 and 138 form part of a voltage divider circuit to bias transistors 119 and 120.

The connector block 128 of the error signal generator unit 4 has lead 130 to supply the common B plus line through protective diode 129, lead 131 to ground, lead 132 to transistor 119, lead 133 to transistor 120, lead 134 to the Hall element motor 42 and leads 135 and 136 in the balancing bridge of the Hall element. These leads are connected to the power unit 2 in the manner illustrated in FIGURE 3.

Figure 3:
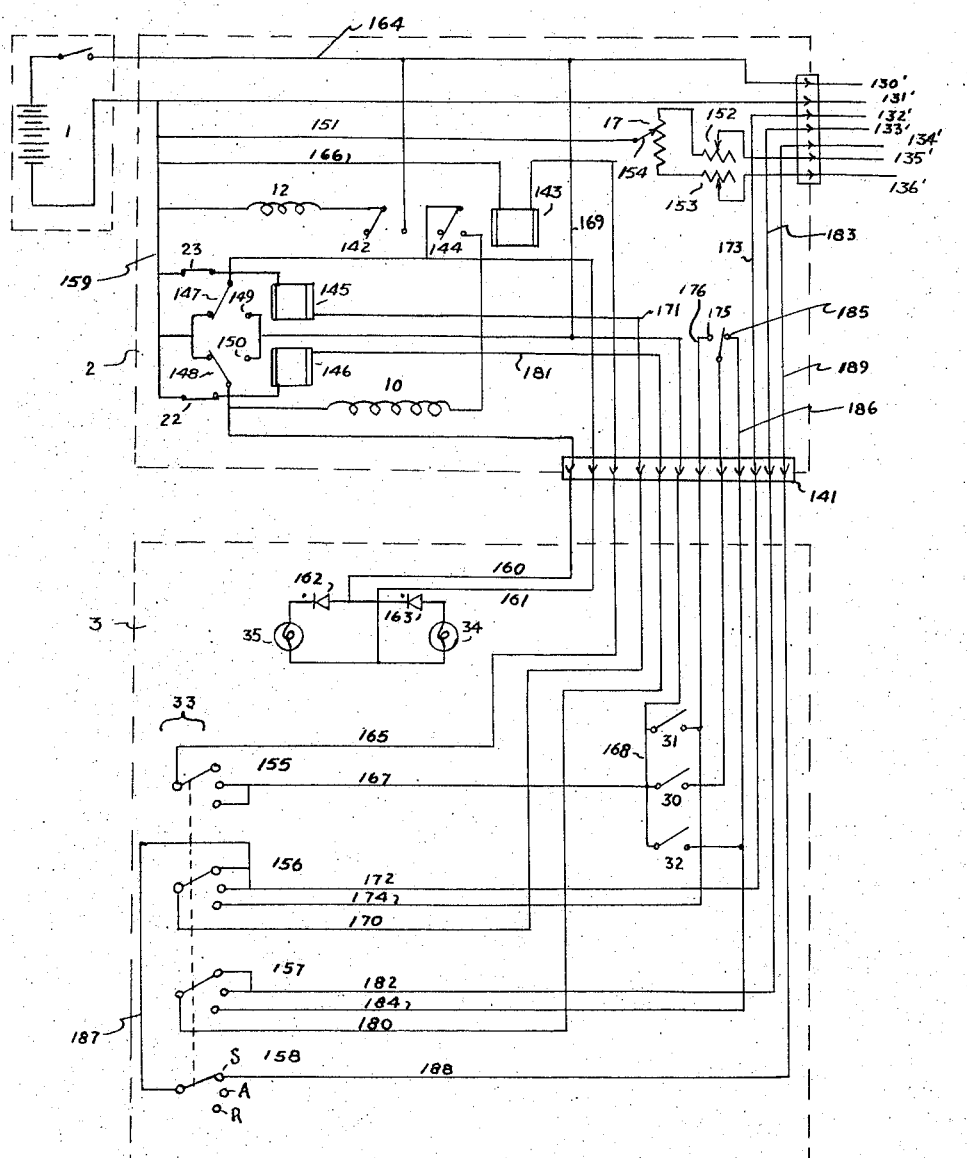
FIGURE 3 shows the schematic circuitry of the control power unit and the remote hand control unit of our autopilot.

The circuits illustrated in FIGURE 3 comprise the power unit 2 circuit with its associated electrical clutch and rudder motor relays and the remote hand unit 3 circuit with the aforementioned selector switch 33, indicator lights 35 and 34 and rudder control switches 30, 31 and 32.

The power unit 2 contains the electrical clutch 12 and drive motor 10 actuated by relay coil 143 and switch arms 142 and 144. Right and left relay coils 145 and 146 are provided in the rudder motor circuit and these coils actuate switch arms 147 and 148, respectively, to close their circuits by contacting fixed contacts 149 and 150. The rudder limiting switches 23 and 22 previously described in regard to FIGURE 1 are in the relay coil circuits in order to interrupt the current flow through the coils and de-energize the rudder motor when the maximum rudder throw is reached. The remainder of the circuitry in the power unit comprises the previously described potentiometer 17 which is connected across leads 135′ and 136′ that are in the bridge circuit across the input electrodes of the Hall element. This bridge circuit also includes calibrating variable resistors 152 and 153 which can be parallel windings of a single dual potentiometer to permit effective variation in the range of the potentiometer 17 of the bridge circuit. This variation can be used to change the feedback range of the bridge circuit thereby providing adjustment of the autopilot to craft having varied steering linkages or to permit variable adjustment in the rudder throw to compensate for various sea conditions. As previously mentioned, variable tap 154 of the potentiometer is mechanically coupled to the rudder; see FIGURE 1, shaft 16. Lead 151 couples this variable tap to lead 131 which is grounded; see FIGURE 2; and thereby provides connection to the grounded center tap 78 of the primary winding of the output transformer 75.

In the remote hand unit, leads 160 and 161 connect the indicator light circuit in parallel to the rudder motor 10. The rudder motor relays operate to control the direction of current flow through the winding 10 of the rudder motor and thus control the direction of this motor. Diodes 162 and 163 are used in the indicator light circuit to permit current flow through either the left or right light in accordance with the direction of the current flow through motor 10 to thereby indicate right or left movement of the rudder when switch 33 is in the A or R position. The lights also indicate whether the Hall element is null, since flashing of these lights indicates that motor 42 is still turning the Hall element towards null. When the lights stop blinking, the Hall element has achieved null with respect to the new course and switch 33 can then be moved from S to A.

Switch 33 is a four pole, three position wafer switch having switch sections 155, 156, 157 and 158 mounted on a single shaft. The four poles of this switch provide selection of S, A or R. Lead 165 connects the pole of switch 155 is series with relay coil 143 and to the negative bus 159 by lead 166. The A and R positions of the switch are connected by a common lead 167 to lead 168 which is attached to the positive bus 164 by lead 169. In this fashion, closure of the circuit by turning the pole arm of switch section 155 to either A or R will energize the coil 143 to engage the electrical clutch 12 and to permit energizing of rudder motor 10 by relay coils 145 or 146.

Section 156 of switch 33 is in the circuit to energize relay coil 145 of the motor control circuit. The pole of switch 156 is connected in series with relay coil 145 by leads 170 and 171 to the negative bus 159 through limiting switch 23. The A position of the switch section 156 is connected by lead 172 through connector box 141 to lead 173 which is connected to lead 132' that connects to amplifier transistor 119; see FIGURE 2. The R position of switch section 156 is connected to fixed contact 175 of the rudder centering switch 21 by leads 174 and 176.

Switch section 157 of switch 33 is in the circuit to energize relay coil 146 of the motor control circuit. The pole of this switch is connected in series with coil 146 by leads 180 and 181 and to the negative bus through limiting switch 22. The S and A positions of this switch have a common lead 182 to leads 183 and 133' which is connected to transistor 120 of the amplifier unit 4. The position R of switch section 157 is connected to the fixed contact 185 of rudder centering switch 21 by leads 184 and 186.

Switch section 158 of selector switch 33 has its pole connected to lead 172 by lead 187. Position S of this switch section is connected to lead 134 shown in FIGURE 2 by leads 188 and 189. Lead 134 is in series with the motor windings of motor 42 which as previously mentioned, is used to rotate the Hall element to null.

The switch arms of the remote hand unit switches 30, 31 and 32 are connected to a common lead 168 which is connected by lead 169 to the positive bus 164. Lead 167 provides a circuit through switch 155 in either the A or the R position, through relay coil 143 to the negative bus 159 thereby energizing this relay and engaging the solenoid electrical clutch 12.

To employ switches 30, 31 or 32, the selector switch is moved to the R position. Closure of switch 31 will then energize the right relay coil 145 of the rudder motor 10 by completing a circuit through leads 174, 170 and 171 to relay coil 145 to move the rudder to the right. Similarly, closure of switch 32 will complete a circuit through lead 184, lead 180 and lead 181 to relay coil 146 to move the rudder motor to the left. The centering switch 30 is connected to the switch arm of centering switch 21 which is moved by cam 18 (FIGURE 1) to engage either fixed contact 175 or 185. This switch is in parallel with the previously mentioned switches 31 and 32 so that the centering switches 30 and 21 energize the relay coils 145 and 146 in the same manner as switches 31 and 32. In this manner, the rudder is returned to center and oscillated about its center position by switch 30.

In the S position, switch 155 opens the power unit circuit, interrupting current flow through relay coil 143. Switches 142 and 144 then open and disengage electrical clutch 12 and deactivate the rudder motor control circuit. In this position, motor 42 is energized by a voltage bridge comprising transistor switches 119 and 120 and relay coils 145 and 146. One side of the bridge circuit is traced from the positive bus 164 through transistor switch 119, leads 132 and 172, through switch section 156 to leads 170, 171 and relay coil 145 through limit switch 23 to negative bus 159. The other side of the bridge is traced from the positive bus 164 through transistor 120, leads 133, 183 and 182, switch section 157, leads 180 and 181, relay coil 146 and limit switch 22 to the negative bus 159. Motor 42 is connected between the sides of this bridge by leads 172 and 187 from switch section 156 to switch section 158, leads 188, 189 and 134 to motor 42 and lead 133. When transistor 119 conducts, the resistance of relay coil 145 causes an increase in the voltage at switch section 156. This increase in voltage causes current to flow through the motor 42 and relay coil 146 thereby effecting rotation of the Hall element proportional to the current flow through the transistor 119 side of the bridge. Since the magnitude of this current flow is proportional to the strength of the error signal, it is apparent that motor 42 is thus caused to rotate directly in response to the magnitude of this error signal. In a similar fashion, transistor 120 effects opposite rotation of motor 42.

The operation of the autopilot is apparent from the preceding description. When the craft is guided into the desired heading, the remote hand switch 33 is turned to standby and motor 42 is connected to the output of the amplifier unit 4 to rotate the Hall element of the autopilot to a null position. After the course is achieved and lights 34 and 35 stop blinking, switch 33 is turned to automatic and this locks the physical position of the Hall element to the craft and thereafter, any craft deviation from the set heading will deflect the Hall element, creating an error signal between the Hall element output and the reference or input alternating current signal. The output signal is amplified and a direct current error signal obtained therefrom by phase discriminator 63. Further amplification of the error signal through transistors 117 and 118 creates a signal that activates either one of switches 119 and 120 to energize either right relay coil 145 or left coil 146.

A continuous correction will deflect the craft's rudder 6 to a degree proportional to the deviation of the craft from the set heading by the following sequence. The initial corrective deflection of rudder 6 will also move variable tap 154 of potentiometer 17 and upset the resistive balance in the Hall element bridge. This change in resistive balance effects a new null of the Hall element in an erroneous heading. Accordingly, as the craft responds to the initial rudder correction, it may again deflect the rudder in the same direction if the rudder did not deflect sufficiently in its initial correction to prevent the craft from further deviation. As the craft returns to the originally set heading, the Hall element now is deflected out of the new null in a direction opposite to the original deflection and an opposing signal is generated which modifies the initial corrective rudder movement and returns rudder 6 to the course null as the craft approaches the set heading. In this fashion, a proportionate control is effected. If the operator wishes to interrupt the autopilot and employ the remote unit 3, switch 33 is turned to the remote position R. The interlock between the craft and the Hall element is not interrupted by this change and the original heading can be resumed by returning 33 to the A position. The power may also be switched to off, leaving switch 33 in the A position and the craft maneuvered by the helm until the power is switched to on and the originally set course resumed by the autopilot.

Because variable tap 154 of potentiometer 17 is mechanically linked to the rudder position, the craft can be trimmed for cross-current forces. The trimming is effected simply by off-setting the rudder by either the helm or remote unit with switch 33 in the standby position S to counter the cross-course force. Motor 42 will rotate the Hall element to a null position. Since the variable tap of potentiometer 17 is mechanically linked to the rudder position the resultant null position of the Hall element will incorporate the off-set rudder position and, when locked to the craft in the automatic position, will maintain the set course. The change in the resistive null of the Hall element resulting from the change in the balancing circuit by the off-set rudder feedback from potentiometer 17 does not affect the autopilot control of the craft since the Hall element is moved to a physical null after this change in resistive null. In this manner, a single signal generator, i.e., the Hall element, can be used to effect directional and trim control of a craft.

The preceding disclosure is intended to describe our invention in a clear and concise manner and to set forth the best mode contemplated for carrying out our invention. It is not intended that our invention be limited to the specific elements set forth, but rather that the invention comprise the elements and their obvious equivalents set forth in the following claims.

We claim:

1. A circuit having a direction sensing means to be positioned in a magnetic field in a null position thereto and to effect a phase shift in an electrical signal, the magnitude and direction of said phase shift being determined by the degree and direction of movement of said direction sensing means from said null position in said magnetic field that comprises:

a semi-conductor body exhibiting the Hall effect with a first pair of electrodes positioned along a first axis and at opposite edges of said body, a second pair of electrodes also positioned at opposite edges of said body and along a second axis substantially transverse to said first axis;

an alternating current supply circuit comprising a source of alternating current, first and second conductive means coupling said source of alternating current across said first pair of electrodes;

first and second impedances coupled between said first and second conductive means, parallel to said first pair of electrodes;

an output transformer, the primary winding of said output transformer being connected across the second pair of said electrodes and third conductive means from the center tap of said primary winding to a point between said first and second impedances.

2. The circuit of claim 1 wherein at least one of said impedances is variable to permit variation of the resistive null of said semi-conductor.

3. The circuit of claim 2 in combination with a craft having a control surface movable with respect thereto to control the direction of said craft, said circuit adapted for controlling the direction of said craft along a set course and for generating an error signal having a magnitude proportional to the degree of corrective action to be applied to said control surface to correct deviation of said craft from said set course that comprises:

means to lock the position of said semi-conductor to said craft;

a potentiometer coupled between said first and second conductive means and said third conductive means coupled to the variable tap of said potentiometer; and means to lock the position of said variable top to said direction controlling surface to effect a movement of said tap proportionally to the degree of movement of said surface.

4. The circuit of claim 3 also having a dual potentiometer with parallel windings wherein said first and second impedances comprise said parallel windings of said dual potentiometer.

5. The circuit of claim 3 also comprising means to amplify the output signal of said semi-conductor to provide an amplified alternating current error signal, means to compare said amplified signal to a reference signal from said source of alternating current and to obtain an error signal therefrom having a magnitude proportional to the degree of movement of said semi-conductor and a polarity corresponding to the direction of said movement, means to amplify said error signal, a direct current motor to move said control surface, first and second relays in parallel relay control circuits to control the direction of current through the windings of said motor, and switch means in said relay control circuits responsive to said error signal to energize either of said relays in response to the polarity of said error signal.

6. An automatic control device for a craft having a control surface movable with respect thereto to control the direction of said craft, a motor for connection to said surface for operation thereof, means connecting said motor to said surface, directional control means on said craft comprising a source of a reference alternating current signal, a semi-conductor body exhibiting the Hall effect with a first pair of electrodes at opposite edges of said body connected to said source of signal and a second pair of electrodes along an axis substantially transverse to said first pair of electrodes; an output transformer and conductive means coupling opposite ends of the primary winding of said transformer to said second pair of electrodes; first and second impedances connected across said source of signal and parallel to said first pair of electrodes; conductive means coupling the center tap of said primary winding to a point between said first and second impedances; means to amplify the output signal appearing across the secondary winding of said output transformer; means to compare said amplified signal to said reference signal and obtain an error signal therefrom; and motor actuating means to operate said motor in a direction responsive to the direction of movement of said semi-conductor.

7. The control device of claim 6 also comprising means to feedback a signal to the input of the semi-conductor body to shift the resistive null thereof and thereby effect a proportionating control of said surface that comprises a potentiometer connected across said source of alternating current signal in parallel with said first pair of electrodes; conductive means between said center tap of said primary winding to the variable tap of said potentiometer; and means to lock the position of said variable tap to the position of said control surface to effect a movement of said tap proportional to the degree of movement of said surface.

8. The control device of claim 7 also comprising a variable impedance in series with said potentiometer and in parallel to said first pair of electrodes, said impedance being adjustable to change the resistive null of said body to correct inherent misalignment of the output electrodes of said body.

9. The control device of claim 7 wherein said first and second impedances are variable to permit adjustment of said control device to crafts having varied mechanical linkages between said motor and said control surface.

10. The control device of claim 7 wherein said semi-conductor is mounted with gimbal means in a vertical plane together with time delay means in said means to amplify the output signal to cancel out short duration error signals resulting from vertical movement of said semi-conductor body.

11. The control device of claim 7 comprising means to rotate said semi-conductor body relative to said craft to position said body in a substantially null generating position in the earth's magnetic field.

12. An automatic control device for a craft having a control surface movable with respect thereto to control the direction of said craft, a motor for connection to said surface for operation thereof, means connecting said motor to said surface, automatic directional control means on said craft to control said surface and maintain said craft on a set course comprising a source of a reference alternating current signal; a semi-conductor body exhibiting the Hall effect with a first pair of electrodes at opposite edges of said body connected to said source of reference signal and a second pair of electrodes along an axis substantially transverse to said first pair of electrodes; first and second impedances connected across said reference signal and conductive means coupling the center tap of said primary winding to a point between said first and second impedances; means to amplify the output signal appearing across the secondary winding of said output transformer, means to compare said amplified signal to said reference signal and obtain an error signal therefrom; and motor actuating means to operate said motor in a direction responsive to the direction of said error signal; remote control means to interrupt said automatic directional control means and to permit remote manual actuation of said motor comprising means to operate said motor and effect right, left and center positioning of said surface and means to disengage said automatic directional control means from control of said motor and to engage said remote control means.

13. The automatic control device of claim 12 wherein said semi-conductor body is rotatably mounted in a horizontal plane in combination with second motor means to effect rotation of said body in said plane and means on said remote unit to engage said second motor means in response to said error signal to thereby move said semi-conductor body to a null position in the earth's magnetic field.

14. The control device of claim 12 also comprising means to feedback a signal to the input of the semi-conductor body to shift the resistive null thereof and thereby effect a proportionating control of said surface that comprises a potentiometer across said source of alternating current signal in parallel with said first pair of electrodes, conductive means coupling said center top of said primary winding to the variable tap of said potentiometer, and means interlocking the position of said variable tap of said potentiometer to the position of said control surface.

15. The control device of claim 14 also comprising a variable impedance in series with said potentiometer and in parallel to said first pair of electrodes, said impedance being adjustable to change the resistive null of said body to correct inherent misalignment of said electrodes.

16. The control device of claim 14 wherein said first and second impedances are variable and are coupled to opposite ends of said potentiometer to permit adjustment of said control device to crafts having varied mechanical linkages between said motor and said control surface.

17. The control device of claim 13 wherein said semi-conductor is supported with a gimbal mount in the vertical plane in combination with a time delay means in said means to amplify to thereby cancel out short duration error signals that result from vertical movement of said semi-conductor body.

References Cited

UNITED STATES PATENTS

| | | | |
|---|---|---|---|
| 2,891,205 | 6/1959 | Freeman | 318—19 |
| 3,164,013 | 1/1965 | Schmahl | 318—32 XR |
| 3,179,864 | 4/1965 | Kramer | 318—28 |

BENJAMIN DOBECK, *Primary Examiner.*